United States Patent
Chen et al.

(10) Patent No.: US 8,340,137 B2
(45) Date of Patent: Dec. 25, 2012

(54) SEGMENTED AND OVERLAPPED SKEW TRACKING METHOD FOR SERDES FRAME INTERFACE LEVEL 5

(75) Inventors: Liang Chen, Shanghai (CN); Yi Jie Xue, Shanghai (CN); Hong Wei Wang, Beijing (CN); Shu Gong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/775,519

(22) Filed: May 7, 2010

(65) Prior Publication Data

US 2010/0306603 A1  Dec. 2, 2010

(30) Foreign Application Priority Data

May 31, 2009   (CN) .......................... 2009 1 0141313

(51) Int. Cl.
*H04J 3/06* (2006.01)
*H04L 7/00* (2006.01)
*H04B 17/00* (2006.01)
(52) U.S. Cl. ........................ 370/516; 375/371; 398/25
(58) Field of Classification Search .................. None
See application file for complete search history.

(56) References Cited

U.S. PATENT DOCUMENTS

| | | | | |
|---|---|---|---|---|
| 5,455,831 A | * | 10/1995 | Bartow et al. | 714/700 |
| 6,336,192 B1 | * | 1/2002 | Sakamoto et al. | 713/503 |
| 6,557,110 B2 | * | 4/2003 | Sakamoto et al. | 713/503 |
| 7,130,317 B2 | * | 10/2006 | Annadurai et al. | 370/516 |
| 7,352,204 B2 | | 4/2008 | Frisch | |

(Continued)

FOREIGN PATENT DOCUMENTS

| | | |
|---|---|---|
| CN | 101097771 A | 1/2008 |
| CN | 101242238 A | 8/2008 |
| WO | WO2007005686 A1 | 1/2007 |
| WO | WO2007052229 A2 | 5/2007 |

OTHER PUBLICATIONS

Application No. 200910141313.8, Filed: May 31, 2009, "Information Materials for IDS", cited in CN Office Action dated Jul. 4, 2012.

*Primary Examiner* — Steven H Nguyen
*Assistant Examiner* — Soon-Dong D Hyun
(74) *Attorney, Agent, or Firm* — Yuanmin Cai

(57) ABSTRACT

A method and device for performing skew detection on data transmitted over a data channel and a high speed optical communication interface including the device are disclosed, wherein data of a reference frame over a reference channel is composed sequentially of a reference data segment with a length of Umax over each of data channels to be subject to skew detection. The method includes: S1) performing the following on one frame of data transmitted over one data channel in a period of one frame: a) dividing the frame of data into a plurality of data blocks according to the maximum allowable skew detection range Rmax; b) dividing each of the data blocks into a plurality of segments each with the length of Umax; c) serially comparing each of the segments in the respective data blocks with the corresponding reference data segment, respectively, to derive skew detection results of all the segments in the respective data blocks; and d) for each of the data blocks, selecting the skew detection result of one of all the segments in the data block as a skew detection result of the data block; and S2) selecting a skew detection result with the maximum skew from among the skew detection results of all the data blocks as a skew detection result of the frame of data.

20 Claims, 10 Drawing Sheets

U.S. PATENT DOCUMENTS

| | | |
|---|---|---|
| 7,356,722 B2 | 4/2008 | Lau et al. |
| 7,359,407 B1 * | 4/2008 | Mattos et al. ................ 370/509 |
| 7,729,415 B1 * | 6/2010 | Possley ........................ 375/219 |
| 2003/0095575 A1 * | 5/2003 | Annadurai et al. ........... 370/516 |
| 2007/0006053 A1 | 1/2007 | Otto et al. |
| 2008/0031311 A1 | 2/2008 | Haas et al. |
| 2008/0031312 A1 | 2/2008 | Haas et al. |
| 2008/0126888 A1 | 5/2008 | Haas et al. |
| 2008/0205889 A1 * | 8/2008 | Aoki ............................... 398/51 |
| 2010/0215060 A1 * | 8/2010 | Haas ............................ 370/509 |

* cited by examiner (5) Compare with the 2nd segment (6) Compare with the 2nd segment (7) Compare with the 2nd segment (8) Compare with the 2nd segment

SEGMENTED AND OVERLAPPED SKEW TRACKING METHOD FOR SERDES FRAME INTERFACE LEVEL 5

CROSS-REFERENCE TO RELATED APPLICATION

The present application claims the benefit of priority of a Chinese Patent Application Serial Number 200910141313.8, entitled "SKEW DETECTION METHOD AND DEVICE, AND HIGH SPEED OPTICAL COMMUNICATION INTERFACE", filed May 31, 2009 with the State Intellectual Property Office (SIPO) of the People's Republic of China, the content of which is incorporated herein by reference in its entirety.

FIELD OF THE INVENTION

The present invention generally relates to the field of optical communication, and in particular relates to the field of high speed optical communication interfaces in an optical communication system.

BACKGROUND OF THE INVENTION

In recent years, there is a constantly increasing demand for network capacity along with rapid development of high speed Internet, video services and large-capacity private-line services, thereby propelling development of networks toward larger capacity and higher rate. Operators worldwide have successively performed field test and started commercial network construction of high speed transmission systems. High speed transmission systems at as high as 40 Gbits/s now has become one of the focuses in the communication industry.

Currently, Optical Internetworking Forum (OIF) proposes an international standard for a line interface of communication system with a high speed optical link (typically at a bit rate of 40 Gbits/s), i.e., the SERDES Framer Interface Level 5 (SFI-5) standard. The SFI-5 standard is a protocol used between three primary components of such a high speed optical communication system at 40 Gbits/s including, i.e., a framer, a Forward Error Connection (FEC) processor and a Serializer/Deserializer (SERDES). For more details of SFI-5 standard, reference may be made to "SERDES Framer Interface Level 5 (SFI-5): Implementation Agreement for 40 Gbits/s Interface for Physical Layer Device" which is available from the OIF website at www.oiforum.com. As described in this document, an interface between respective components operates at a very high frequency due to a demand for huge throughout. Ideally, transmission of data over respective data channels (i.e., over respective optical fibers for transmission of the data) is mutually synchronous, that is, data is temporally aligned at the same instance of time. However, in practical application, different delays may arise in respective data channels due to noise and the like. For example, if data over a certain data channel is delayed, then data received over the respective channels will no longer be aligned. At this time, the data over the channel where a delay occurs is referred to as having been skewed. Therefore, a deskew process is required to compensate for differences between delays to align the data received, so that the data can be properly received.

In order to compensate for a delay, firstly skew detection and then deskew are required for each data channel. During skew detection, according to the SFI-5 standard, an important concept is data of a reference channel transmitted using a separate data path (i.e., another optical fiber), wherein one frame of data over the reference channel is aggregation of data slices of data at different instances of time over each data channel to be subject to skew detection, and a data slice over a certain data channel is compared with a data slice corresponding to the certain data channel over the reference channel to determine whether the data over the certain data channel has been skewed. Most of conventionally available solutions adopt a sequential skew detection method, also referred to as a serial matching method. In the serial matching method, a delay window is applied to data channels, and then data over the data channels is sequentially compared bit by bit with data over the reference channel corresponding to the data channels starting from the Most Significant Bit (MSB) to the Least Significant Bit (LSB), to search serially for a match between the respective data channels and the reference channel.

FIG. 1 is a schematic diagram illustrating a process of a conventionally typical serial matching method. In the serial solution illustrated in FIG. 1, bit-level comparison is performed between a data channel and a reference channel during data link transmission. According to the existing standard, consecutive 64-bit comparison is required to be performed for each data channel to be subject to skew detection, thereby resulting in an excessively long locking period. Due to noise and the like, mismatch frequently arises between a data channel and the reference channel in most cases, and at this time the data channel has to be unlocked, and according to the standard, there is one frame of time for waiting until the next matching operation, thereby resulting in waste of 64-bit time multiplied by the number of channels or more (bit time is also referred to as UI, where 1 UI is one-bit delay time). Moreover, noise is common in a high speed transmission environment, so that a mismatching point may arise over the link and consequently improper locking may occur, thereby wasting effective bandwidth. In order to overcome this situation, a signal with an excessively large skew has to be detected and compensated for. Therefore, larger bandwidth may be wasted due to limitation of the serial method in the case of a large number (e.g., 16) of data channels to be subject to skew detection. Additionally, the SFI-5 standard has defined the maximum allowable skew, which nevertheless may be difficult to be achieved due to serious influence of super high speed transmission of data via the interface, noise, etc.

In view of the foregoing circumstances, it is highly desired for a technology that can solve at least partly the foregoing problems present in the prior art.

SUMMARY OF EMBODIMENTS OF THE INVENTION

The Summary of the invention will be given below to provide basic understanding of some aspects of the invention. It shall be appreciated that this Summary is neither exhaustively descriptive of the invention nor intended to define essential or important parts or scope of the invention, but is merely for the purpose of presenting some concepts in a simplified form and hereby acts as a preamble of more detailed description which will be presented later.

In order to solve the foregoing problems in the prior art, an object of the invention is to provide a method and device for performing skew detection on data transmitted over a data channel, which can overcome one or more of the drawbacks present in the prior art.

Another object of the invention is to provide a high speed optical communication interface in which the above method is performed and/or which includes the above device.

In order to achieve the above objects, according to an aspect of the invention, there is provided a method for performing skew detection on data transmitted over a data channel, wherein data of a reference frame over a reference channel is composed sequentially of a reference data segment with a length of Umax over each of data channels to be subject to skew detection, and a preset maximum allowable skew detection range is Rmax, the method including: S1) performing the following on one frame of data transmitted in a period of one frame over one of the data channels to be subject to skew detection: a) dividing sequentially the frame of data into a plurality of data blocks starting from the start location of the frame of data according to the maximum allowable skew detection range Rmax; b) dividing each of the data blocks into a plurality of segments each with a length of Umax; c) for each of the data blocks, comparing serially each of the segments in the data block with a reference data segment over the reference channel corresponding to the data channel, to derive skew detection results of all the segments in the data block; and d) for each of the data blocks, selecting the skew detection result of one of the segments from among the skew detection results of all the segments in the data block as a skew detection result of the data block according to a predetermined setting; and S2) selecting a skew detection result with the maximum skew from among the skew detection results of all the data blocks of the frame of data over the data channel as a skew detection result of the frame of data over the data channel.

According to another aspect of the invention, there is also provided a device for performing skew detection on data transmitted over one data channel, wherein data of a reference frame over a reference channel is composed sequentially of a reference data segment with a length of Umax over each of data channels to be subject to skew detection, and a preset maximum allowable skew detection range is Rmax, the device including: a data block divider adapted to, for each frame of data transmitted over one data channel to be subject to skew detection, divide sequentially the frame of data into a plurality of data blocks starting from the start location of the frame of data according to the maximum allowable skew detection range Rmax; a data segment divider adapted to divide each of the data blocks into a plurality of segments each with a length of Umax; a comparator adapted to perform serial comparison between all the segments in one data block and the reference data segment corresponding to the data channel and output skew detection results of all the segments in the data block; a selector adapted to select the skew detection result of one of the segments from among the skew detection results of all the segments in one data block according to a predetermined setting and output it as a skew detection result of the data block; and a frame data skew detection result determiner adapted to select a skew detection result with the maximum skew from among the skew detection results of all the data blocks of each frame of data over the data channel as a skew detection result of each frame of data over the data channel.

According to still another aspect of the invention, there is also provided an apparatus for performing skew detection on data transmitted over a plurality of data channels, which includes: a plurality of devices described as above, adapted to respectively perform skew detection on data transmitted over each of the plurality of data channels to be subject to skew detection and delayed; and a central state machine adapted to generate enable signals to be respectively provided to the plurality of devices, wherein the enable signal input to each of the devices is controlled to control when to start skew detection on the data over each of the data channels and delay time of the data over each of the data channels. The data over the respective data channels is temporally delayed differently from each other, so that the data over the succeeding one of any two adjacent ones of the data channels is temporally delayed by less than Rmax relative to the data over the preceding one.

According to a further aspect of the invention, there is also provided a high speed optical communication interface including the above apparatus for performing skew detection on data transmitted over a plurality of data channels.

An advantage of the invention lies in that, in the method, device and high speed optical communication interface according to embodiments of the invention, data transmitted in a period of one frame over a data channel to be subject to skew detection is divided into blocks and segments, and serial comparison is performed between respective data segments in each of the data blocks and a corresponding reference data segment, so the maximum allowable skew detection range Rmax of the whole skew detection system can be increased and the same function can be achieved merely with addition of a few circuits but without doubling the circuit dimension.

Another advantage of the invention lies in that, in the method, device and high speed optical communication interface according to the embodiments of the invention, an existing skew detection circuit with a low skew detection capability can be used without modifying the skew detection circuit during serial comparison between the respective data segments in each of the data blocks and the corresponding reference data segment, so cost can be saved and the circuit dimension of the whole skew detection system cannot be increased.

A further advantage of the invention lies in that, in the method, device and high speed optical communication interface according to the embodiments of the invention, skew detection is performed independently from each other on data over a plurality of data channels to be subject to skew detection, and the data over the data channels is temporally delayed differently from one data channel to another so that comparison periods of data blocks with the same serial number over two adjacent data channels overlap with each other, thereby expediting the whole skew detection process, shortening a locking period and saving bandwidth and hence facilitating more efficient transmission of data.

These and other advantages of the invention will become more apparent from the following detailed description of preferred embodiments of the invention taken in conjunction with the drawings.

BRIEF DESCRIPTION OF THE DRAWINGS

The invention can be better understood with reference to the description given below in conjunction with the accompanying drawings, throughout which identical or like reference signs are used to denote identical or like components, and together with which the following detailed description are incorporated into and form a part of the specification and serve to further illustrate the preferred embodiments of the invention and to explain the principle and advantages of the invention. In the drawings.

Figure 1:
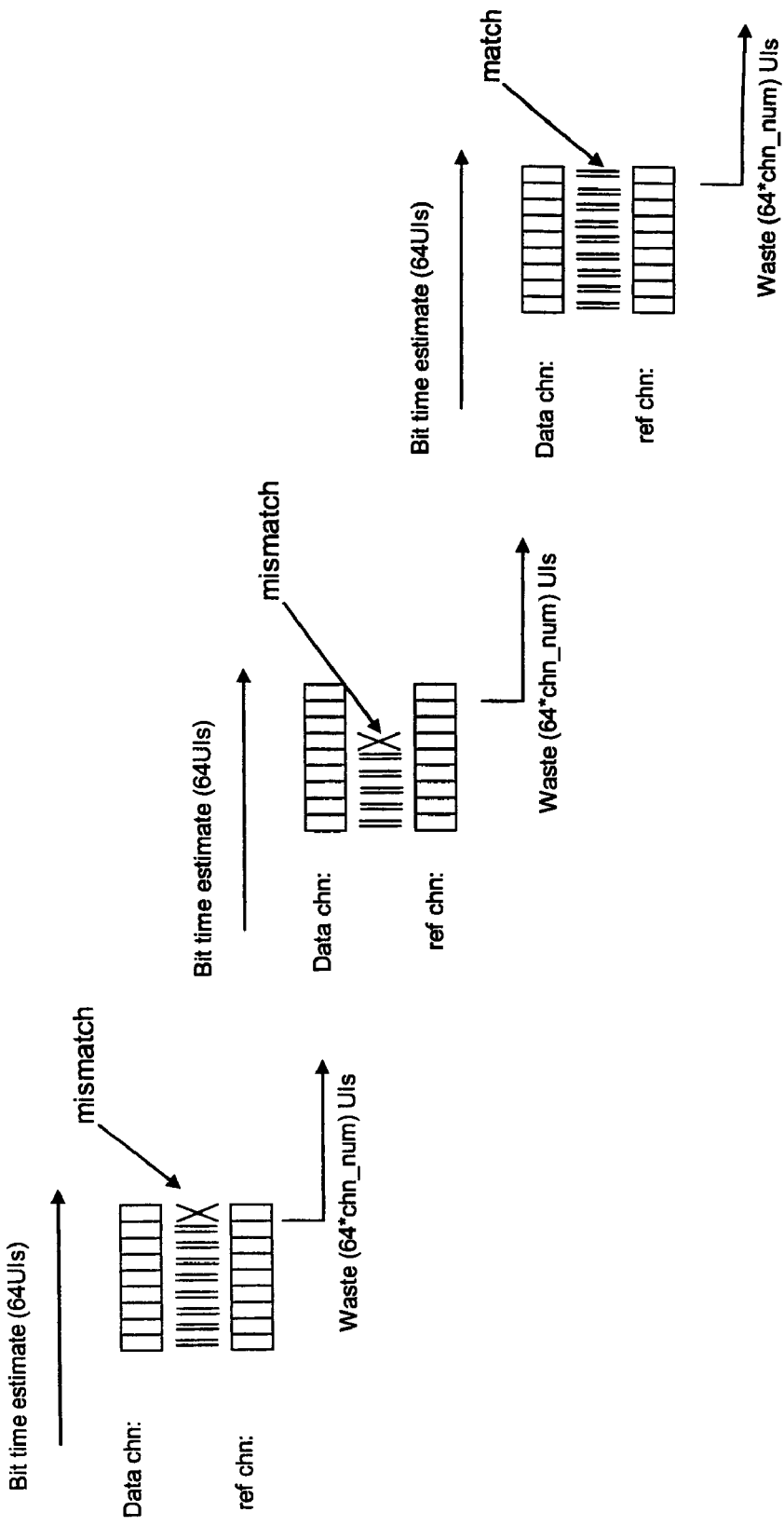
FIG. 1 is a schematic diagram illustrating a process of a conventionally typical serial matching method.

Those skilled in the art will appreciate that elements in the drawings are illustrated merely for simplicity and clarity and have not necessarily been drawn to scale. For example, dimensions of some of the elements in the drawings may have been enlarged relative to other elements to facilitate understanding of the embodiments of the present invention.

DETAILED DESCRIPTION OF THE INVENTION

Exemplary embodiments of the present invention will be described below in conjunction with the accompanying drawings. For the sake of clarity and conciseness, not all the features of practical implementations have been described in the specification. However, it is to be appreciated that during developing any of such practical implementations, numerous implementation-specific decisions shall be made to achieve the developer's specific goals, for example, to comply with system- and business-related constraining conditions which may vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to solutions of the invention will be illustrated in the drawings while other details less relevant to the invention are omitted so as not to obscure the invention due to those unnecessary details.

Figure 2:
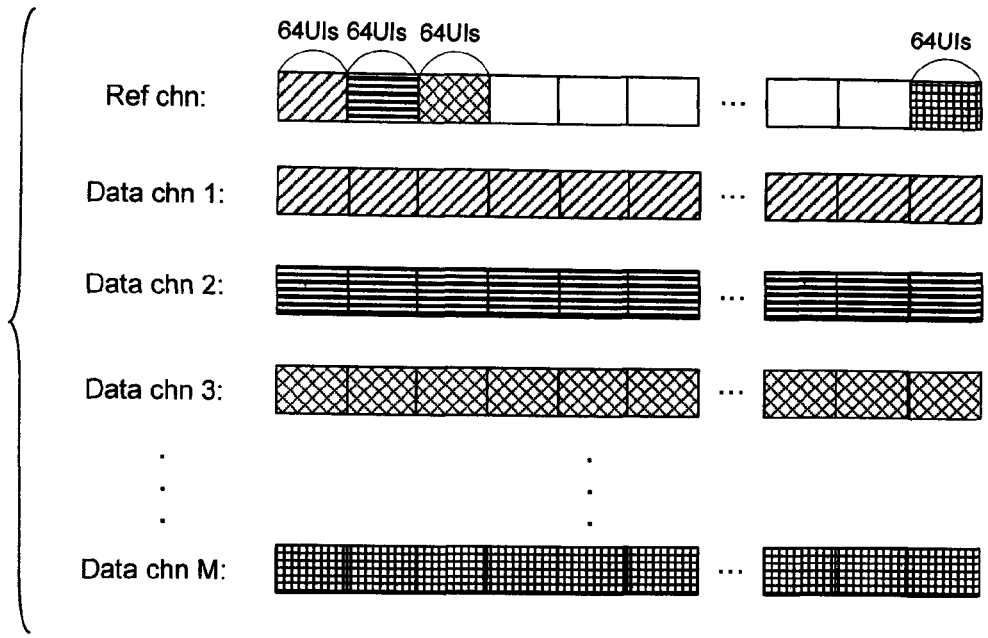
FIG. 2 is a schematic diagram illustrating a relationship between data over a reference channel and data over data channels to be subject to skew detection in accordance with the SFI-5 standard.

FIG. 2 is a schematic diagram illustrating a relationship between data over a reference channel and data over data channels to be subject to skew detection in accordance with the SFI-5 standard. In accordance with the SFI-5 standard, as illustrated in FIG. 2, data with a length of 64 UIs is taken from each of M data channels (M is a natural number) to be subject to skew detection, i.e., from each of a data channel 1 to a data channel M, and sequentially combined to form a reference frame, i.e., data transmitted over the reference channel in a period of one frame. As can be seen from this standard, the data length of the reference frame, i.e., the length of reference data transmitted in the period of one frame, is equal to 64 UIs multiplied by the total number M of the data channels (i.e., 64 UIs×M). It shall be noted here that the length of the data and the length of the period are in a one-to-one correspondence relationship in the technical field and therefore those skilled in the art will not distinguish them. For example, data transmitted in a period of 64 UIs can also be referred to data with a length of 64 UIs, and data transmitted in a period of one frame can also be referred to as one frame of data.

For convenience of description, 64 UIs will be referred below to as the maximum common segment length (denoted with Umax), which means that there is data with a length of 64 UIs over each of the data channels to be subject to skew detection which is the same as data over the reference channel, and the data with a length of Umax from a data channel x (x is a natural number and $1 \leq x \leq M$) constituting the data of the reference frame will be referred to as a reference data segment corresponding to the data channel x (or simply referred to as a corresponding reference data segment). Moreover, terms "data", "segment" or "sub-segment" mentioned generally in this specification refer to data over a data channel to be subject to skew detection or part thereof, unless stated otherwise.

In accordance with the SFI-5 standard, during skew detection on data transmitted over a certain data channel in a period of one frame, data transmitted over the data channel in the period of one frame is compared with a reference data segment over a reference channel corresponding to the data channel to determine a skew value between the data channel and the reference channel and accordingly perform a deskew process. As mentioned above, the skew value between the reference channel and the data channel tends to be larger than Umax due to noise and the like. Therefore, the whole skew detection system is required to have a powerful skew detection capability, i.e., to increase the maximum allowable skew detection range (denoted by Rmax).

Figure 3:
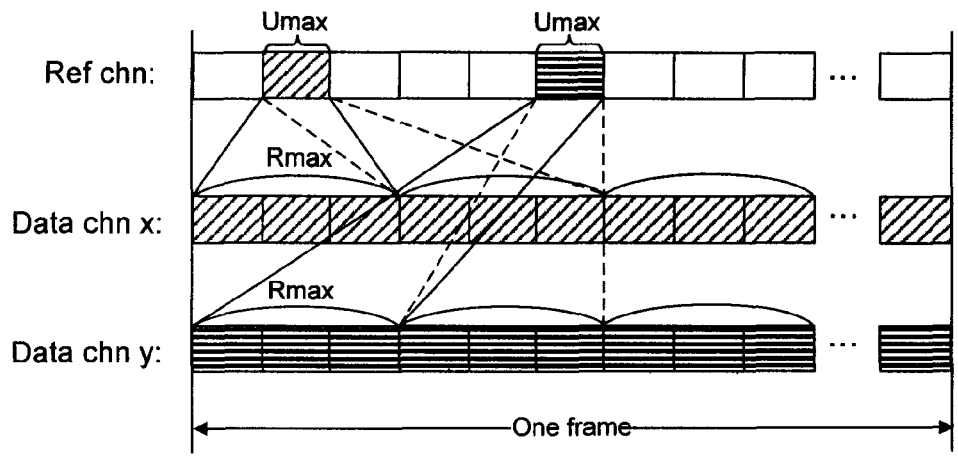
FIG. 3 is a schematic diagram illustrating a relationship between the maximum allowable skew detection range Rmax and the maximum common segment length Umax of the whole skew detection system according to an embodiment of the invention.

FIG. 3 is a schematic diagram illustrating a relationship between the maximum allowable skew detection range Rmax and the maximum common segment length Umax of the whole skew detection system according to an embodiment of the invention (here a situation of Rmax=3 Umax is illustrated). For convenience, there is illustrated in this figure only a situation where data with a length of one frame is transmitted over a reference channel, a data channel x and a data channel y. Here, the maximum allowable skew detection range Rmax of the whole skew detection system is the maximum allowable skew detection range of any of the data channels, which is twice the maximum one of allowable skew values between the respective data channels 1 to M to be subject to skew detection and the reference channel, that is, the maximum allowable skew between the data channels and the reference channel is ±Rmax/2. In the situation as illustrated in FIG. 3, the maximum allowable skew between the data channels and the reference channel is ±96 UIs when Umax=64 UIs as defined in the SFI-5 standard. However, those skilled in the art will appreciate that the principle of the invention will not be limited to only the situation of Rmax=3 Umax but can be extended to a situation where Rmax is an integer multiple of Umax.

Figure 4:
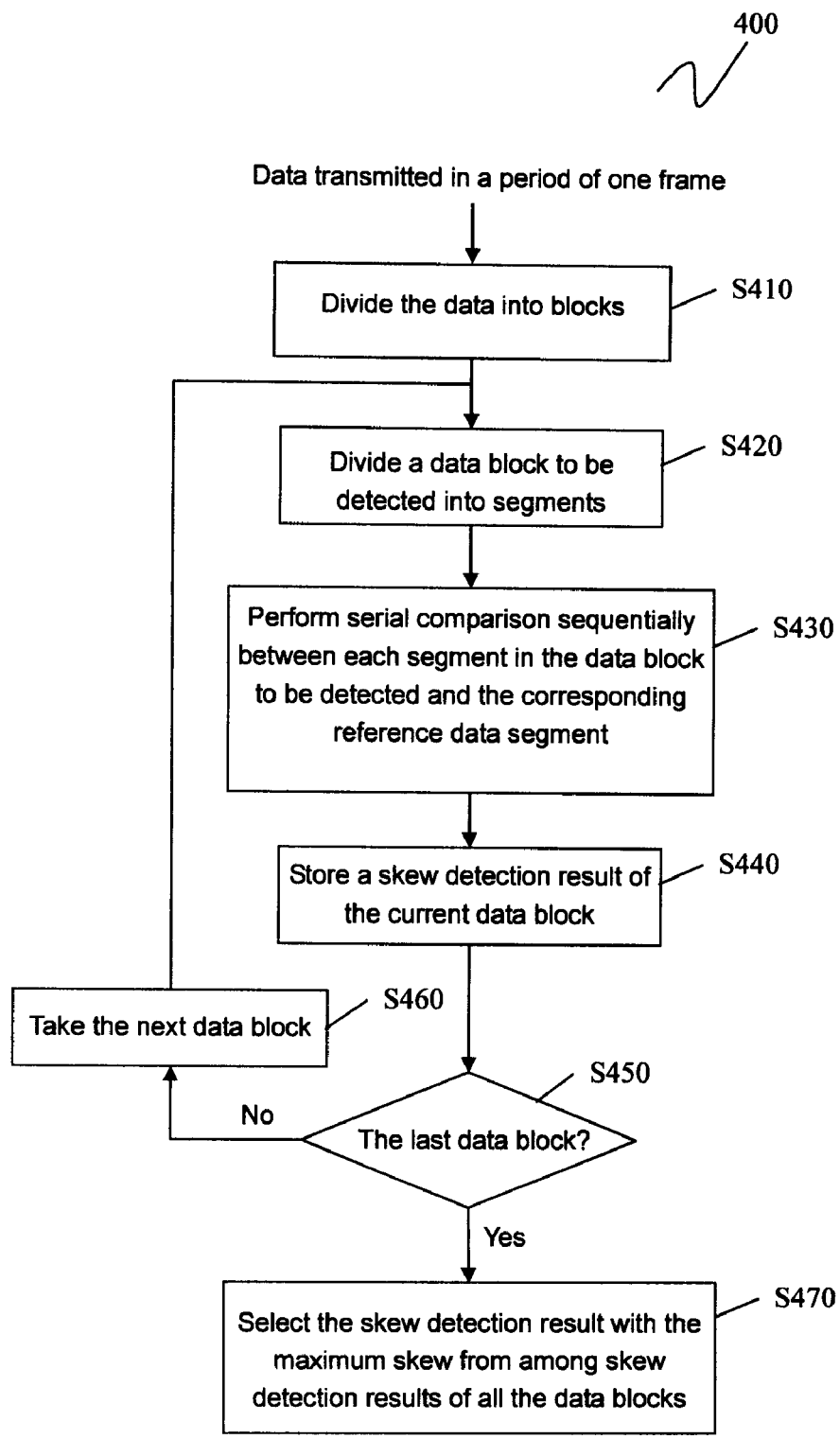
FIG. 4 is a schematic flow chart of a method for performing skew detection on data transmitted over one data channel (e.g., a data channel x) in a period of one frame according to an embodiment of the invention.

FIG. 4 is a schematic flow chart of a method 400 for performing skew detection on data transmitted over one data channel (e.g., a data channel x) in a period of one frame according to an embodiment of the invention.

As illustrated in FIG. 4, data of one frame (it is assumed herein that the data length thereof is denoted by Lx) transmitted over the data channel x in a period of one frame is divided into blocks according to the maximum allowable skew detection range Rmax in step S410. Here, the data of one frame can be divided sequentially into several data blocks starting from the start location of the data according to the length of Rmax. In this way, the data with the length of Lx can be divided into Num(block)=Lx/Rmax data blocks in the case that Rmax can be exactly divided by Lx. For example, FIG. 3 illustrates results of dividing the data transmitted over the data channel x and the data channel y in a period of one frame as described above (where Rmax=3 Umax).

Then, starting from the first data block, in step S420, a current data block to be subject to skew detection (simply referred below to as a data block to be detected) is divided into segments according to the maximum common segment length Umax, so that the data length of each of the segments is Umax and there is overlapping data with a length of r between two adjacent ones of the segments. Thus, the data block with the length of Rmax can be divided into Rmax/(Umax-r) segments, and the data with a total length of Lx can be divided into Num(segment)=Lx/(Umax-r) segments.

It shall be noted here that, in view of a possible skew between two adjacent segments, a certain amount of overlap is required between the adjacent segments during dividing the data block into segments in order to enable such a skew to be detected. The length of the overlapping data between the segments is set according to the length of data that can be received by a skew detection circuit in each cycle of comparison.

Next in step S430, serial comparison is performed sequentially between the respective segments in the data block to be detected and a reference data segment corresponding to the data channel x, thereby deriving skew detection results of the respective segments. In this step, such serial comparison can be performed using an existing serial skew detection circuit.

Figure 5:
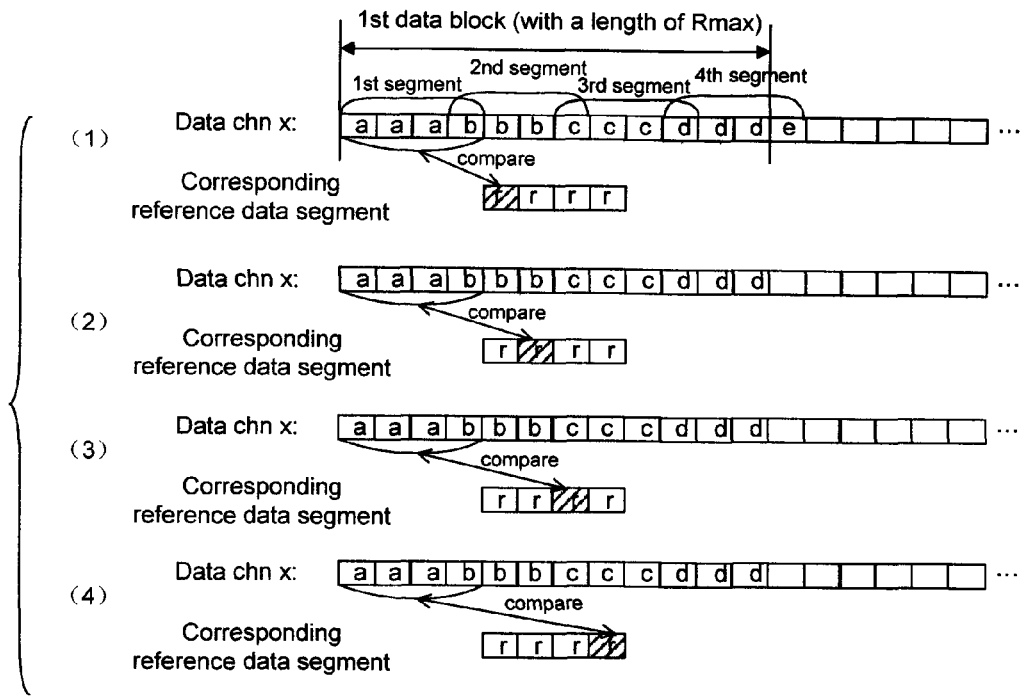
FIG. 5 is a schematic diagram of a process of performing search comparison on a first segment in a first data block with a length of 3 Umax over the data channel x using a serial skew detection circuit with a skew detection capacity value C=Umax/4, here search comparison refers to comparison with sub-segments in a reference data segment starting from each location of the data block to find a match.

In this step, since the length of each of the segments is Umax (equal to 64 UIs in the case of applying the SFI-5 standard), the serial skew detection circuit in use is required to have a skew detection capability up to or above Umax. However, the existing serial skew detection circuit with such a skew detection capability is costly. For this reason, an existing serial skew detection circuit with a skew detection capability value C<Umax (Umax here is an integer multiple of the skew detection capability value C for convenience of circuit design) is considered to be used to perform comparison. Thus, as illustrated in FIG. 5, both each of the segments and the reference data segment are subdivided into several sub-segments each with a length of C (the total number of sub-segments in one segment=Umax/C), and then search comparison is performed sequentially between the respective sub-segments of the reference data segment and the respective segments over the data channel using the existing serial skew detection circuit with the skew detection capability value C. Here, search comparison refers to comparison with sub-segments in the reference data segment starting from respective locations of the data block to find a match.

FIG. 5 is a schematic diagram of a process of performing search comparison on a first segment in a first data block (with a length of Rmax=3 Umax) over a data channel x using a serial skew detection circuit with a skew detection capacity value of C=Umax/4. It is assumed here that there is overlapping data with a length of r=Umax/4 between adjacent segments during dividing the data block into segments (in FIG. 5, Umax is represented with four squares, and both r and C are represented with one square), then dividing the first data block into segments as described above can result in four segments as illustrated in FIG. 5 (that is, a first segment denoted with aaab, a second segment denoted with bbbc and the like in the figure), and then the respective segments and the reference data segment can be divided into four sub-segments according to the skew detection capability value C. After dividing the data over the data channel into blocks and segments, the first to fourth sub-segments in the reference data segment are compared sequentially with the first segment as illustrated with (1) to (4) in FIG. 5. After comparing the reference data segment with the first segment, the other segments in the first data block are compared sequentially with the reference data segment similarly to the first segment, thereby finishing comparison between the first data block and the reference data segment.

Such a process of performing sequentially serial comparison (or search comparison) between individual segments (and even individual sub-segments in each of the segments) of data transmitted over a data channel to be subject to skew detection and the reference data segment is known, therefore detailed description of a specific serial comparison process will be omitted here so as not to obscure the invention due to unnecessary details.

Reference is made back to FIG. 4. In step S440 following step S430, the skew detection result of one of the segments is selected from among the skew detection results of all the segments in the current data block according to a predetermined setting (e.g., priorities of the skew detection results of the respective segments in the data block, etc.) and stored as a skew detection result of the current data block.

In step S450, it is determined whether the data block being currently detected is the last data block in the current frame, and if not, then the process of the method 400 goes to step S460, where the next data block in the current frame is taken as the block to be detected, and then goes back to step S420 so as to perform segment division and skew detection on the next data block. Processing of the above steps S420 to S460 is performed repeatedly until it is determined in step S450 that the data block being currently detected is the last data block in the current frame, thereby finishing skew detection on all the data blocks in the current frame and deriving the skew detection results of all the data blocks.

After it is determined in step S450 that skew detection on all the data blocks in the current frame has been finished, the process goes to step S470, in which a skew detection result with the maximum skew is selected from among the skew detection results of all the data blocks in the current frame as a skew detection result of the current frame of data over the data channel.

The foregoing is presented based upon the assumption that Rmax can be exactly divided by Lx when dividing the data into blocks, but a situation is also possible in which Rmax cannot be exactly divided by Lx, and at this time the maximum allowable skew detection range can be extended for the purpose of exact division by Lx without changing an overhead of hardware itself.

Although skew detection is performed sequentially on all the data blocks in a period of one frame over a data channel to be subject to skew detection starting from the first data block in the process of the method 400 described above with reference to FIG. 4 and FIG. 5, the principle of the invention will apparently not be limited only thereto. For example, it is possible to perform skew detection independently from each other and in parallel on all the data blocks in a period of one frame (at this time the data over the data channel shall be delayed in advance), to expedite the skew detection process and thus shorten a locking period.

A schematic process of the method 400 for performing skew detection on data transmitted over one data channel in a period of one frame has simply been described above with FIG. 4 and FIG. 5. However, those skilled in the art shall appreciate that, the process of the above method 400 can be repeatedly executed frame by frame to perform skew detection on data transmitted over one data channel in a period of time (e.g., a period of plural frames). Moreover, by executing the process of the above method 400 independently from each other for a plurality of data channels to be subject to skew detection, skew detection on data transmitted over the plurality of data channels in a period of one frame (and even a period of plural frames) can be achieved. For example, when processing data in a period of one frame over the data channels x and y illustrated in FIG. 3 (where each of x and y is a natural number less than or equal to the total number M of data channels and x≠y) using the method 400 illustrated in FIG. 4 as described above, the data over the data channels x and y can be divided respectively into plural data blocks according to the maximum allowable skew detection range Rmax of the whole skew detection system, and sequential skew detection can be performed on the respective data blocks over each of the data channels independently from each other.

During skew detection on data over two or more data channels using the foregoing method 400, skew detection can be performed concurrently on the data over the plural data channels in order to expedite the skew detection process. To this end, the method illustrated in FIG. 4 can be improved in an embodiment of the invention so that the data over the data channels is delayed prior to block division into blocks, thereby deriving a method 600 as illustrated in FIG. 6.

Figure 6:
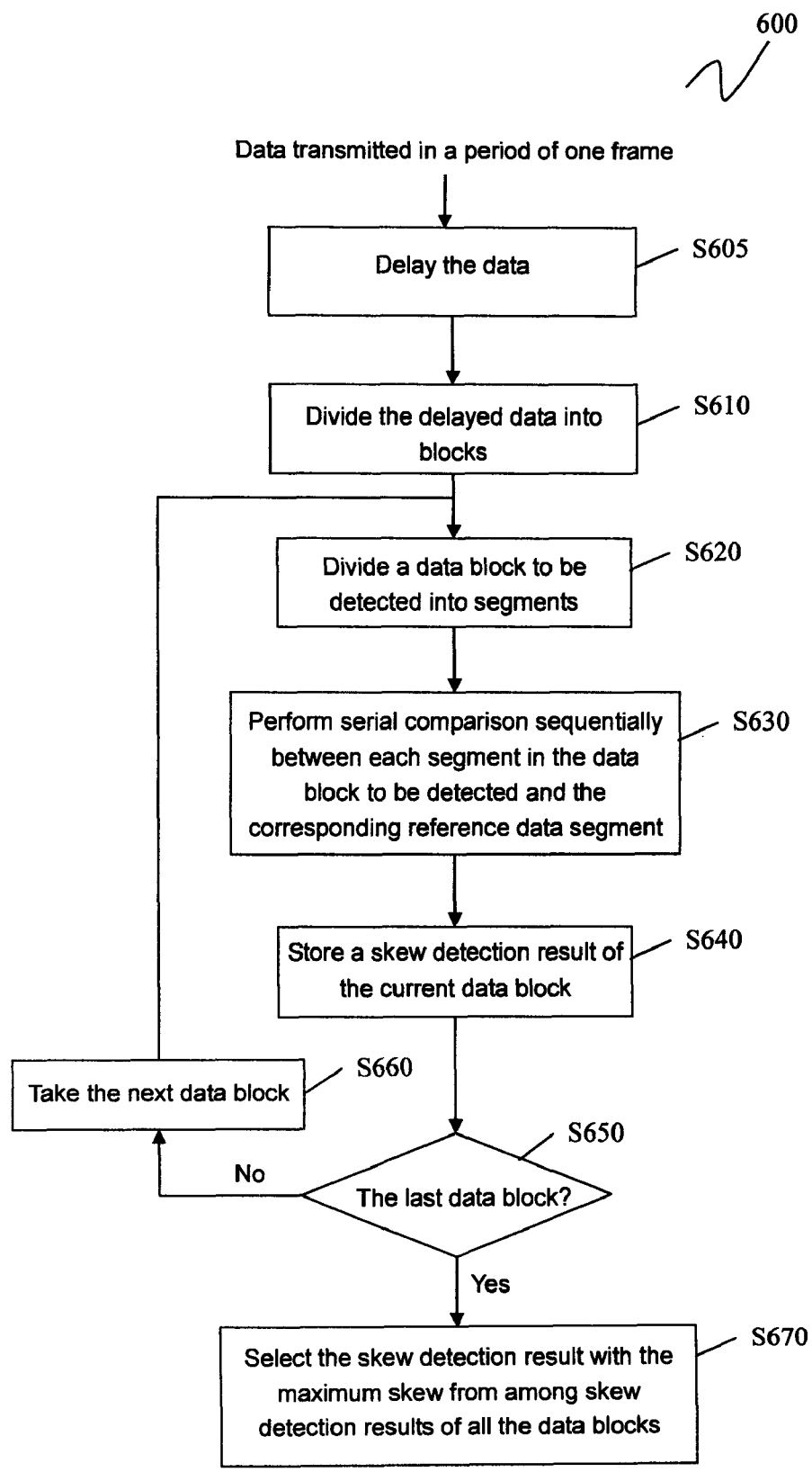
FIG. 6 is a schematic flow chart of a method for performing skew detection on data transmitted over one data channel in a period of one frame according to an embodiment of the invention.
Figure 8A:
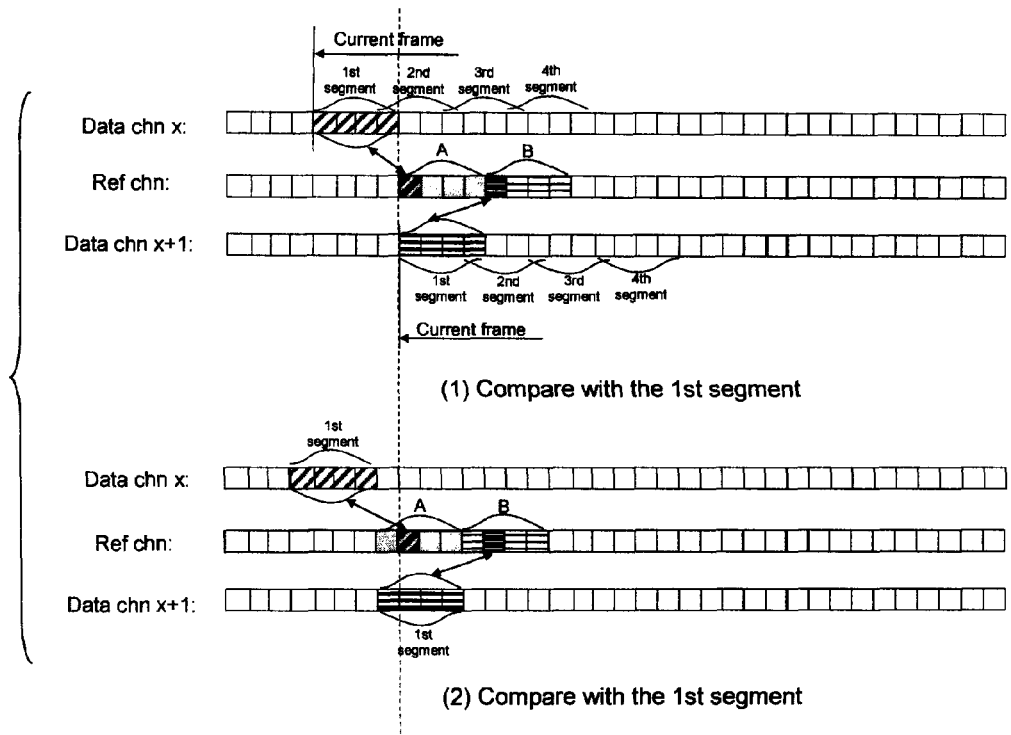
FIG. 8a to FIG. 8d schematically illustrate a part of a process of sequentially performing serial comparison on respective data segments over a data channel x and a data channel x+1 in parallel by performing the method as illustrated in FIG. 6 according to determination of delay time as illustrated in FIG. 7 using a serial skew detection circuit with a skew detection capacity value of C=Umax/4.
Figure 8B:
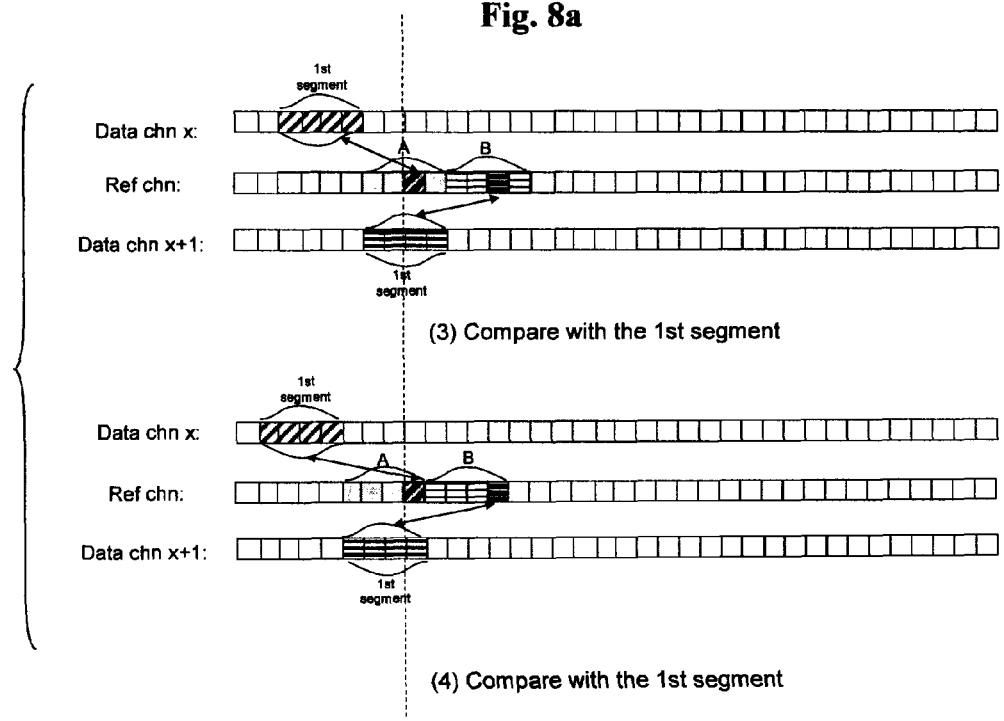
Figure 8C:
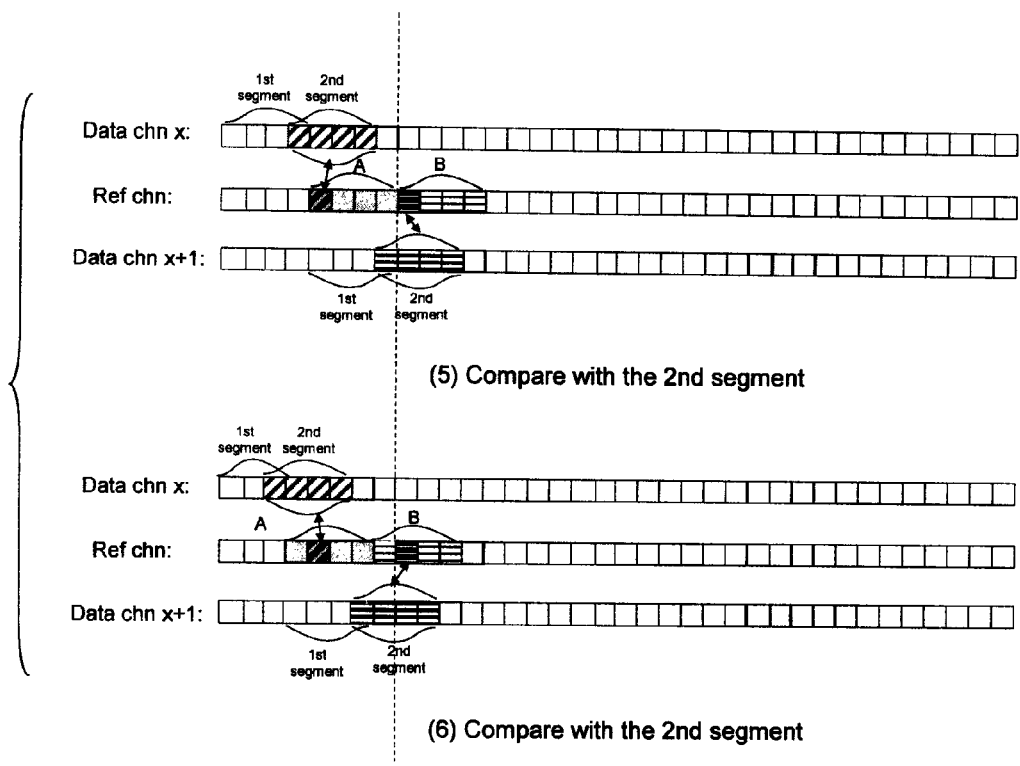
Figure 8D:
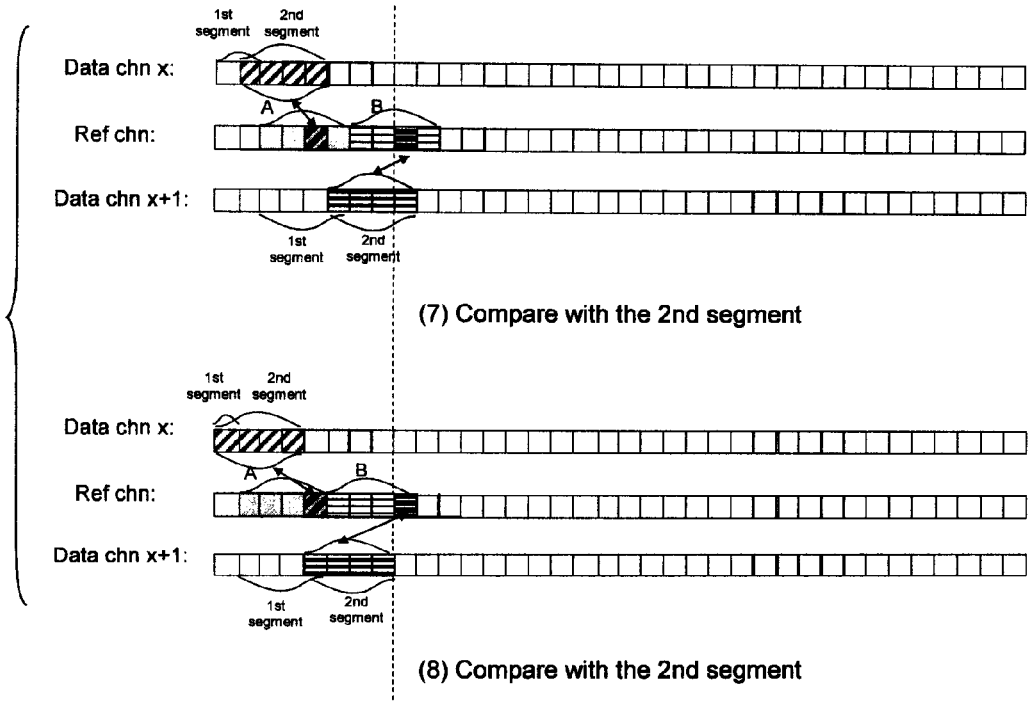

FIG. 6 is a schematic flow chart of the method 600 for performing skew detection on data transmitted over a certain data channel in a period of one frame according to another embodiment of the invention.

The process of the method 600 illustrated in FIG. 6 differs from that of the method illustrated in FIG. 4 only in that, firstly data transmitted over a data channel to be subject to skew detection is delayed in step S605 and then subsequent processing is performed on the delayed data as illustrated in FIG. 4.

Figure 7:
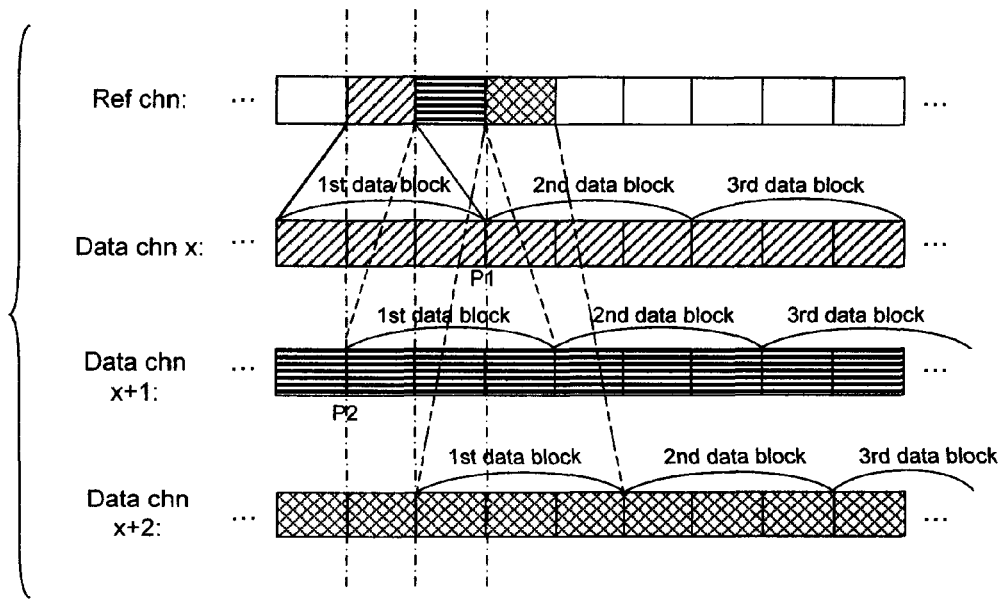
FIG. 7 is a schematic diagram illustrating results obtained by delaying data over data channels and then dividing the data into blocks and segments according to an embodiment of the invention.

Particularly in step S605, the data over the data channel x in a period of one frame can be delayed as illustrated in FIG. 7, so that a point of time determined by taking a length of Rmax/2 forward (i.e., toward the left in the figure) with respect to a point of time centered on the corresponding reference data segment over the reference channel is the start point of the current frame over the data channel. That is, as illustrated in FIG. 7, in the case of Rmax=3 Umax, data with a length of Rmax taken by extending respectively towards both the left and right sides with respect to the central axis of the corresponding reference data segment is the first data block in the current frame of data over the data channel x. This means that the data of the current frame over the data channel x will precede the corresponding reference data segment by a period of Rmax/2−Umax/2. It shall be noted that, there is overlapping data between two adjacent data segments in each data block as described above, but the overlapping data between the two adjacent segments is not illustrated in FIG. 7 for simplify and clarity in view of the smaller length of the overlapping data relative to Umax.

Processing of steps S610 to S670 illustrated in FIG. 6 is the same as that of steps S410 to S470 illustrated in FIG. 4, therefore detailed description of these steps will be omitted here for conciseness of the specification.

When the method illustrated in FIG. 6 is performed in parallel for plural data channels to be subject to skew detection, the respective data channels are temporally delayed differently in a manner similar to that described above, so that the start point of the current frame of data over each of the data channels is at a distance of Rmax/2 preceding the central axis of its corresponding reference data segment, that is, the current frame of data over each of the data channels precedes its corresponding reference data segment by a period of Rmax/2−Umax/2. Thus, for three adjacent data channels, e.g., data channels x, x+1 and x+2, the start point of the current frame of data transmitted and further each of data blocks over each of them can be determined as illustrated in FIG. 7. As can be apparent from FIG. 7, since corresponding reference data segments of two adjacent data channels, e.g., the data channels x and x+1, are also adjacent and Rmax>Umax, a point P1 determined by taking a length of Rmax/2 toward the right over the data channel x with respect to the central axis of its corresponding reference data segment will necessarily be located on the right of a point P2 determined by taking a length of Rmax/2 toward the left over the data channel x+1 with respect to the central axis of its corresponding reference data segment. This means that, comparison periods of data blocks with the same serial number (e.g., the $i^{th}$ data blocks) over the two adjacent data channels will necessarily overlap with each other by an overlapping period of Rmax−Umax. In the case of Rmax=3 Umax, comparison periods of data blocks with the same serial number over the two adjacent data channels will overlap with each other by 2 Umax, that is, the data over the succeeding data channel is delayed by a period of Umax relative to the data over the preceding data channel.

FIG. 8a to FIG. 8d schematically illustrate a part of a process of sequentially performing serial comparison on respective data segments over the data channel x and the data channel x+1 in parallel by performing the method as illustrated in FIG. 6 according to determination of delay time as illustrated in FIG. 7 using a serial skew detection circuit with a skew detection capacity value of C=Umax/4 (where any two adjacent data segments over the same data channel overlap with each other by a data length of r=C=Umax/4). In the case of Rmax=3 Umax, the data over the data channel precedes data of its corresponding reference data segment by a period of Umax, and the data over the data channel x+1 is delayed relative to the data over the data channel x by a period of Umax.

In FIG. 8a to FIG. 8d, in a chronological order of performing detection, (1) to (4) illustrate a process of comparing respectively the first to fourth sub-segments in corresponding reference data segments A and B with the first data segments over the data channel x and the data channel x+1, and (5) to (8) illustrate a process of comparing respectively the first to fourth sub-segments in the corresponding reference data segments with the second data segments over the data channel x and the data channel x+1.

Similarly to the method 400 illustrated in FIG. 4, although skew detection is performed sequentially on all the data blocks in a period of one frame over one data channel to be subject to skew detection starting from the first data block in the process of the method 600 described above with reference to FIG. 6 to FIG. 8, the principle of the invention will apparently not be limited only thereto. For example, it is possible to perform skew detection on all the data blocks independently from each other and in parallel, to expedite the skew detection process and thus shorten a locking period. Moreover, the process of the above method 600 can be repeatedly executed frame by frame in parallel on data over plural data channels to be subject to skew detection, to perform skew detection in parallel on the data transmitted over the plural data channel in a period of time (e.g., a period of plural frames).

As described above, the data over the respective data channels is delayed in step S605 in a way that the current frame of data over each of the data channels precedes its corresponding reference data segment by a period of Rmax/2−Umax/2, so that comparison periods of data blocks with the same serial number over any two adjacent data channels overlap with each other by Rmax−Umax. However, those skilled in the art will appreciate that, the principle of the invention will not be limited to only the foregoing determination of delay time, but it will be sufficient to ensure that comparison periods of data blocks with the same serial number over any two adjacent data channels overlap with each other when delaying the data over the respective data channels, that is, to ensure that the data over the succeeding data channel is delayed relative to the data over the preceding data channel by less than Rmax.

Figure 9:
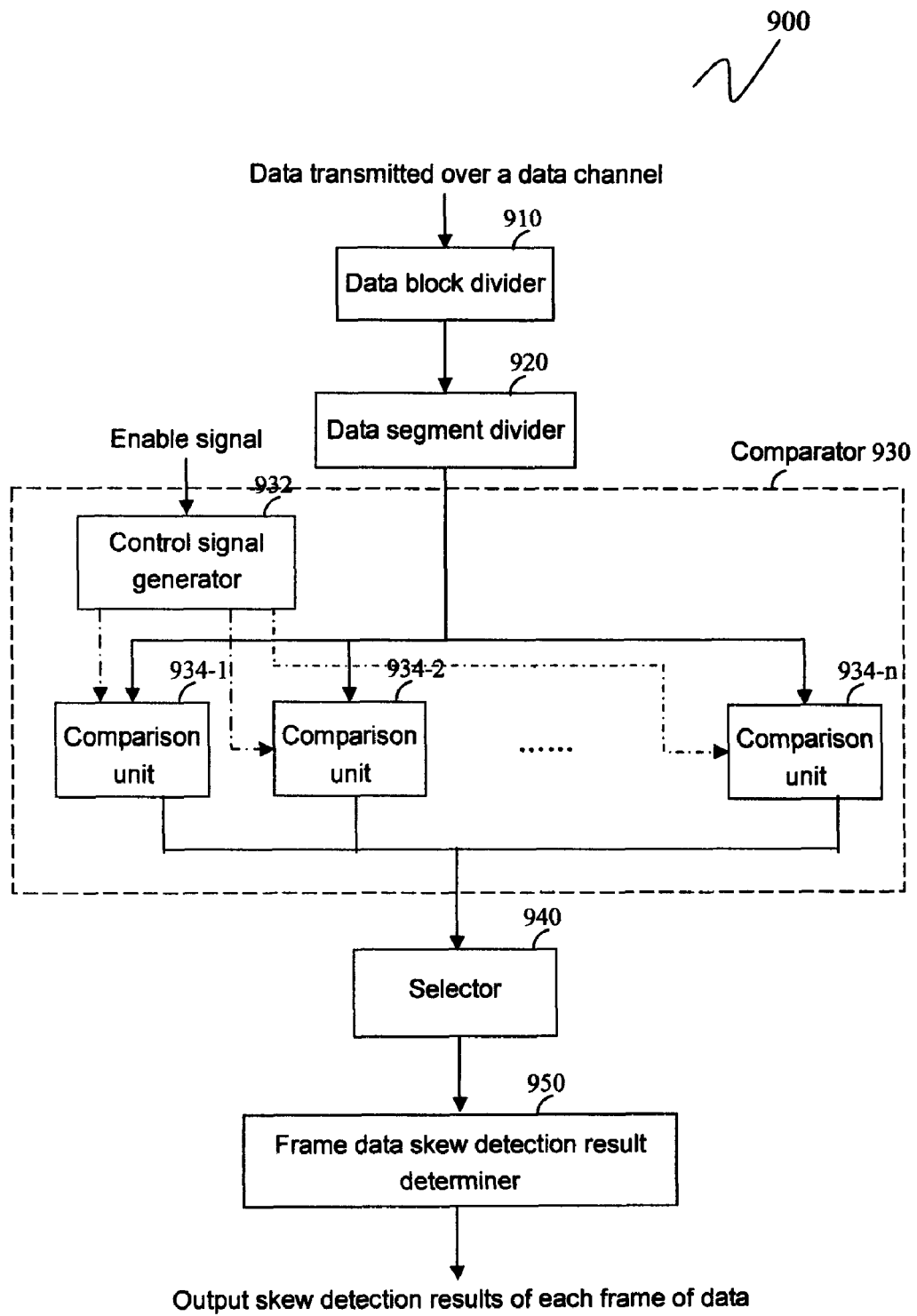
FIG. 9 is a schematic block diagram illustrating a structure of a skew detection device for performing skew detection frame by frame on data transmitted over one data channel according to an embodiment of the invention.

FIG. 9 is a schematic block diagram illustrating a structure of a skew detection device 900 for performing skew detection frame by frame on data transmitted over one data channel to be subject to skew detection according to an embodiment of the invention. The skew detection device 900 can execute the process of the method described above with reference to FIG. 4 and FIG. 5 or the method 600 described above with reference to FIG. 6 to FIG. 8, in which comparison is sequentially performed block by block on data of respective data blocks.

As illustrated in FIG. 9, the skew detection device 900 includes: a data block divider 910 adapted to divide each frame of data transmitted over one data channel to be subject to skew detection into blocks according to the maximum allowable skew detection range Rmax of the whole skew detection system, to derive Num(block) data blocks (firstly the data is delayed when the skew detection device 900 executes the process of the method 600); a data segment divider 920 adapted to divide each of the data blocks into Rmax/Umax segments according to the maximum common segment length Umax, to thereby divide each frame of data into Num(segment) segments; a comparator 930 adapted to perform sequentially serial comparison block by block between each of the data blocks and a reference data segment corresponding to the data channel and sequentially output block by block skew detection results of all the segments in each of the data blocks; a selector 940 adapted to select the skew detection result of one of the segments from among the skew detection results of all the segments in one of the data blocks output from the comparator 930 according to a predetermined setting (e.g., a priority setting, etc.) and output it as a skew detection result of the data block, thereby sequentially outputting block by block skew detection results of the respective data blocks; and a frame data skew detection result determiner 950 adapted to select a skew detection result with the maximum skew from among the skew detection results of all the data blocks in each frame of data over the data channel as a skew detection result of the frame of data over the data channel.

As illustrated in this figure, the comparator 930 further includes a control signal generator 932 and at least n comparison units 934-1, 943-2 . . . 934-n (merely n comparison units are illustrated in the figure).

Particularly, the control signal generator 932 generates control signals for the n comparison units in accordance with an enable signal input from the outside to drive sequentially the n comparison units, so that the succeeding comparison unit performs comparison after comparison by the preceding comparison unit. Particularly, the enable signal is a drive signal indicating whether to perform skew detection on the data over the data channel. When the enable signal becomes valid can be controlled to control when to start skew detection on the data over the data channel, thereby determining a period of time by which the data is delayed.

Each of the comparison units is adapted to compare each of the data segments in one data block with the corresponding reference data segment and can be implemented with an existing serial skew detection circuit. As described above, in the case of the skew detection capability value C of the comparison units less than Umax, it is assumed that Umax is an integer multiple of the skew detection capability value C, then both each of the data segments and the reference data segment can be subdivided into Umax/C sub-segments each with a length of C, and each of the data segments can be compared sequentially with the respective sub-segments of the reference data segment. Here, the number n of the comparison units is set as Rmax/Umax.

Figure 10:
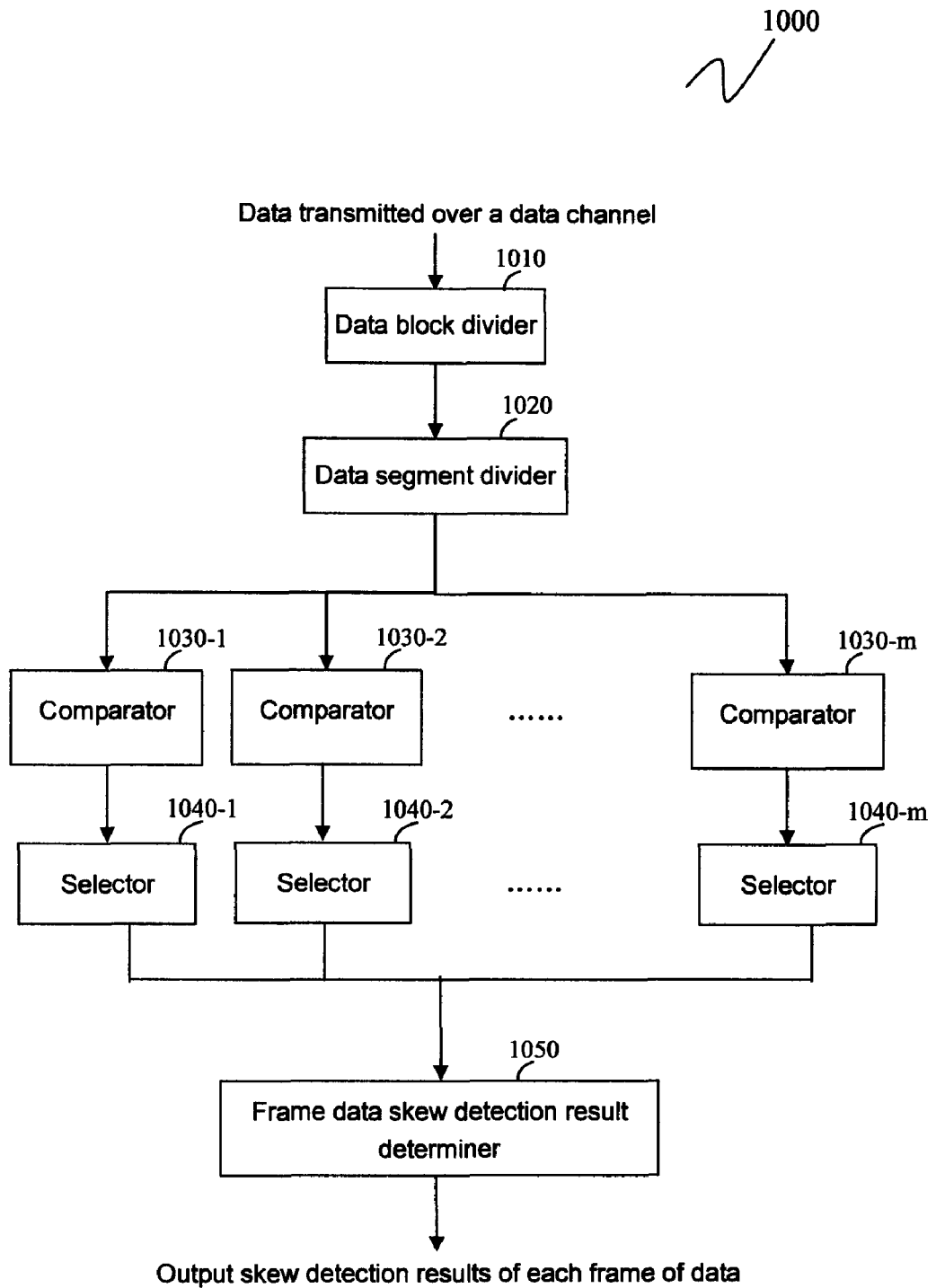
FIG. 10 is a schematic block diagram illustrating a structure of a skew detection device for performing skew detection frame by frame on data transmitted over one data channel according to another embodiment of the invention.

Although skew detection is sequentially performed block by block on the respective data blocks over the data channel in the skew detection device 900 illustrated in FIG. 9 as described above, the principle of the invention will apparently not be limited only thereto, and it is possible to perform skew detection in parallel on the respective data blocks to expedite the skew detection process. FIG. 10 is a schematic block diagram illustrating a structure of a skew detection device 1000 for performing skew detection frame by frame on data transmitted over one data channel to be subject to skew detection according to another embodiment of the invention, wherein comparison is performed on respective data blocks in one frame in parallel.

The skew detection device 1000 illustrated in FIG. 10 differs from the skew detection device 900 illustrated in FIG. 9 only in that m comparators 1030-1, . . . , 1030-m and m selectors 1040-1, . . . , 1040-m are included in place of the only one comparator 930 and one selector 940. Particularly, m is equal to the total number of data blocks into which one frame of data is divided, i.e., m=Num(block). The functions and structures of a data block divider 1010, a data segment divider 1020, each of the comparators, each of the selectors and a frame data skew detection result determiner 1050 are similar respectively to those of the data block divider 910, the data segment divider 920, the comparator 930, the selector 940 and the frame data skew detection result determiner 950, therefore detailed description thereof will be omitted here to avoid unnecessary repetition.

As can be apparent from the foregoing, in a high speed optical communication interface such as an SERDES framer interface, etc., by using the method and/or the device according to the embodiments of the invention as described above with reference to FIG. 2 to FIG. 10 independently from each other for each of data channels to be subject to skew detection, skew detection can be performed on data transmitted over each of the data channels.

Figure 11:
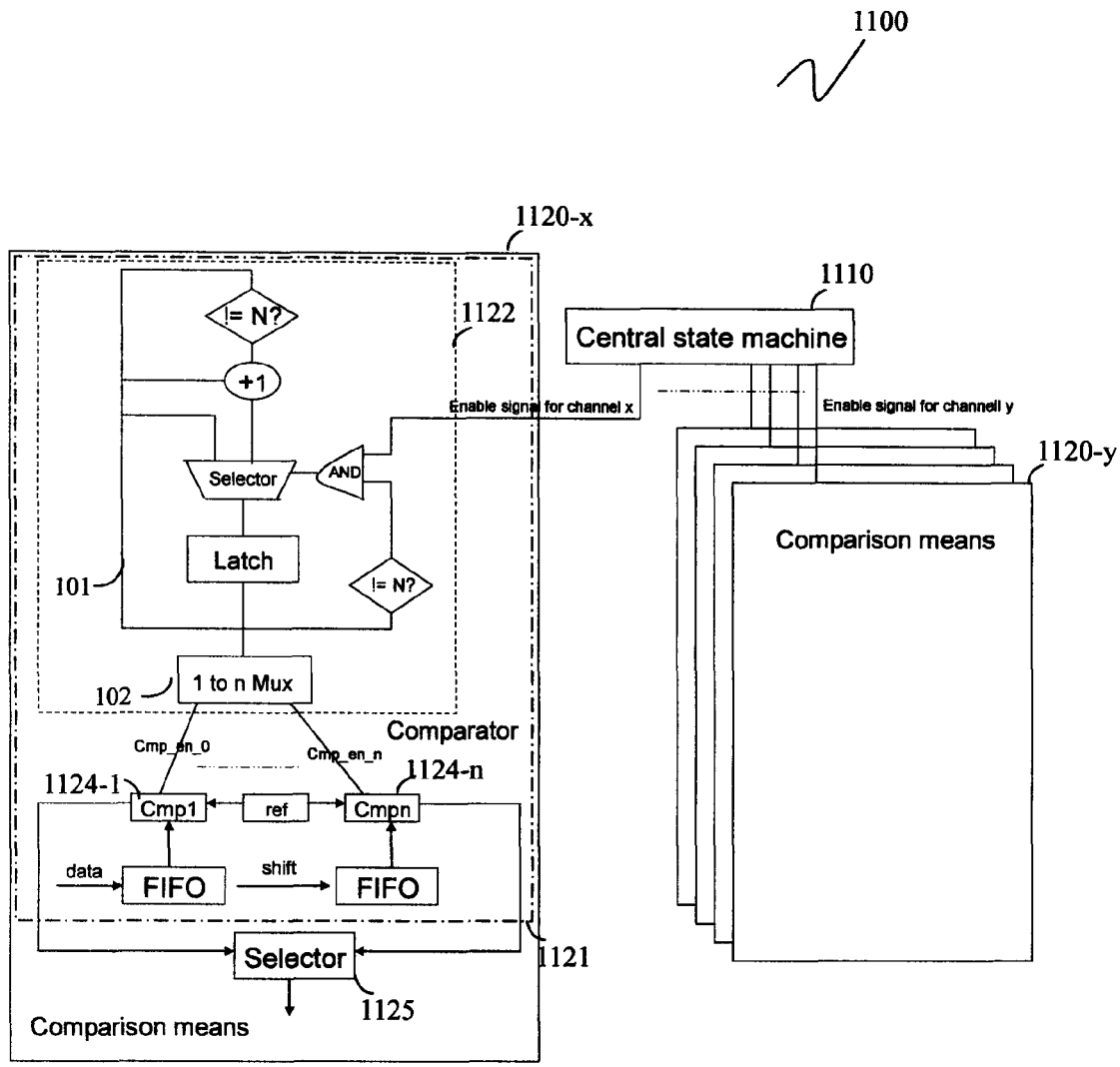
FIG. 11 is a schematic diagram illustrating a structure of a part of a high speed optical communication interface according to an embodiment of the invention.

FIG. 11 is a schematic diagram illustrating a structure of a part of a high speed optical communication interface 1100 according to an embodiment of the invention, in which the skew detection device as illustrated in FIG. 9 or FIG. 10 is used for each of data channels to be subject to skew detection. FIG. 11 merely illustrates those parts related to the comparator and the selector in the skew detection device to facilitate better description of how to process in parallel data over plural data channels to be subject to skew detection.

Although the comparator and the selector have been described as separate components in the foregoing description of the embodiments of the invention with reference to FIG. 9 and FIG. 10, the comparator and the selector can alternatively be integrated into a single device. For example, a comparison means (e.g., a comparison means 1120-x in FIG. 11) includes the comparator 1121 and the selector 1125 as described above.

For example, in the case of using the skew detection device 900 (including only one comparator and one selector) as illustrated in FIG. 9 for a data channel x in the high speed optical communication interface 1100, the comparator 1121 sequentially performs serial comparison block by block between all the data blocks over the data channel x and a corresponding reference data segment in accordance with an enable signal for the data channel x provided from a central state machine 1100, to sequentially output block by block skew detection results of all the segments in the respective data blocks, and the selector 1125 selects the skew detection result of one of the segments from among the skew detection results of all the segments in one of the data blocks output from the comparator 1121 according to a predetermined setting and outputs it as a skew detection result of the one data block, thereby sequentially outputting block by block the skew detection results of the respective data blocks.

Moreover, in the case of using the skew detection device 1000 (including m=Num(block) comparators and m selectors) as illustrated in FIG. 10 for the data channel x in the high speed optical communication interface 1100, for data transmitted in a period of one frame (which can be divided into m data blocks as described above), the m comparators 1121 (not illustrated) respectively perform serial comparison in parallel between all the segments in one data block in a period of one frame and a corresponding reference data segment in accordance with an enable signal for the data channel x provided from the central state machine 1100, to thereby respectively derive skew detection results of all the segments in one data block, and then the m selectors 1125 respectively select the skew detection result of one of the segments from among the skew detection results of all the segments in one data block and outputs it as a skew detection result of the data block.

FIG. 11 further illustrates a schematic circuit logic diagram of a specific structure example of the comparator 1121 (with the same structural block diagram as the comparator 930 shown in FIG. 9) according to an embodiment of the invention. As illustrated, the comparator 1121 includes a control signal generator 1122 and at least n comparison units 1124-1, . . . , 1124-n (merely n comparison units are illustrated in the figure). Particularly, the control signal generator 1122 is adapted to generate control signals Cmp_en__0, Cmp_en_n for driving sequentially the n comparison units 1124-1, . . . , 1124-n respectively in accordance with an enable signal input from the outside, to perform sequentially comparison between respective data segments in one data block and a corresponding reference data segment. Particularly, n=Rmax/Umax as described above.

In the control signal generator 1122, a counter 101 counts from 1 to N in response to high level of the enable signal for the data channel x (it is assumed here that, the high level is valid to indicate that skew detection is allowed to be performed on data over the data channel) and provides a 1-to-n multiplexer 102 with a count result c. Particularly, N is set as the total number Num(segment) of segments into which one frame of data is divided. The 1-to-n multiplexer 102 generates the control signals Cmp_en__0, Cmp_en_n for driving the n comparison units according to the value of the count result c. For example, which of the comparison units to be driven to perform a comparison operation can be determined from the value of Mod(c, n), to thereby set the control signal of the comparison unit to be driven as a valid level (e.g., high level) indicating that the comparison unit is to be driven for comparison, and all the control signals of the other comparison units are set as an invalid level (e.g., low level).

In the high speed optical communication interface 1100 illustrated in FIG. 11, when performing parallel skew detection on data over plural data channels according to the method illustrated in FIG. 6, enable signals of the respective data channels can be controlled as described above to control delay time of the respective data channels, so that the data transmitted over the succeeding data channel (e.g., a data channel x+1) is delayed relative to the data transmitted over the proceeding data channel (e.g., a data channel x) by no more than Rmax and thus comparison periods of data blocks with the same serial number over two adjacent data channels overlap with each other.

The method, device and high speed optical communication interface according to the embodiments of the invention have been described above by taking a high speed optical communication interface compliant with the SFI-5 standard as an example. However, those skilled in the art shall appreciate that, the invention can also be equally applicable to another method, device and/or high speed optical communication interface for performing skew detection on data over data channels in which data of a reference frame is required to be composed sequentially of data segments with the same length (the length of data is referred to as the maximum common segment length Umax) over the respective data channels to be subject to skew detection.

As can be apparent from the foregoing description of the method, device and high speed optical communication interface according to the embodiments of the invention, by dividing each frame of data transmitted over a data channel to be subject to skew detection into blocks and segments and performing serial comparison between the respective data segments in each of the data blocks and a corresponding reference data segment (sequentially block by block or in parallel for each of the data blocks), an allowable skew detection range of the skew detection method or device can be extended for the data over the data channel, thereby improving the maximum allowable skew detection range Rmax of the whole skew detection system without increasing the circuit dimension of the whole skew detection system.

Moreover, when performing serial comparison between the respective data segments in a data block and the corresponding reference data segment, by subdividing both each of the data segments and the reference data segment into several sub-segments, and sequentially comparing each of the data segments with each of the sub-segments of the reference data segment, an existing serial skew detection circuit with a skew detection capability value of C<Umax can be used, thereby saving cost without increasing the circuit dimension of the skew detection system.

Moreover, in the method, device and high speed optical communication interface according to the embodiments of the invention, data over different data channels to be subject to skew detection is delayed differently so that comparison periods of the $i^{th}$ data blocks over two adjacent data channels overlap with each other, to thereby expedite the whole skew detection process, shorten a locking period and save bandwidth and thus facilitate more efficient transmission of data. For example, in the case that the data transmitted over the succeeding data channel (e.g., a data channel x+1) is delayed relative to the data transmitted over the preceding data channel (e.g., a data channel x) by no more than Umax, the locking period can be shortened to be a period of one frame, which will greatly facilitate more efficient transmission of data.

Moreover, in the method, device and high speed optical communication interface according to the embodiments of the invention, existing skew detection circuits with a low detection capability can be multiplexed to thereby avoid an error probability caused by repeated development and shorten time necessary for development. Moreover, such a structure is also well extensible to support a larger allowable skew detection range.

It shall be noted that, in this specification, relationship terms such as left and right, first and second, etc., are merely used to distinguish one entity or operation from another but may not necessarily require or imply any such an actual relationship or order between these entities or operations. Moreover, terms "comprise", "comprising", "include" or any other variations thereof are intended to cover a non-exclusive inclusion so that a process, method, article or device that comprises a list of elements not only includes these elements but also may include other elements not explicitly listed or inherent to such a process, method, article or device. An element preceded by "a" or "an" does not, without more constraints, preclude existence of additional identical elements in the process, method, article, or device that comprises the element.

Although embodiments of the invention have been described in detail above with reference to the accompanying drawings, it shall be appreciated that the embodiments described above are merely used to illustrate the invention but not to limit the invention. Various modifications, substitutions and variations can be made without departing from the spirit and scope of the invention as defined in the appended claims. Moreover, the scope of the invention will not be limited to the embodiments of the structures, means, methods and steps of the process, device, manufacture and substance described in the specification. Those ordinarily skilled in the art can readily appreciate from the disclosure of the invention that structures, means, methods or steps of a process, device, manufacture and substance known now or to be developed in the future, which perform substantially the same functions or achieve substantially the same results as the corresponding embodiments described here, can be utilized according to the invention. Therefore, the appended claims are intended to encompass in their bounds the structures, means, methods or steps of such a process, device, manufacturing and substance.

What is claimed is:

1. A method for performing skew detection on data transmitted over a data channel, wherein data of a reference frame over a reference channel is composed sequentially of a reference data segment with a length of maximum common segment (Umax) over each of data channels to be subject to skew detection, and a preset maximum allowable skew detection range is Rmax, where Rmax is an integer multiple of Umax, the method comprising:
    S1) performing the following on one frame of data transmitted in a period of one frame over one of the data channels to be subject to skew detection:
        a) dividing sequentially the frame of data into a plurality of data blocks starting from the start location of the frame of data according to the maximum allowable skew detection range Rmax;
        b) dividing each of the data blocks into a plurality of segments each with the length of Umax;
        c) for each of the data blocks, comparing serially each of the segments in the data block with a reference data segment over the reference channel corresponding to the data channel, to derive skew detection results of all the segments in the data block; and
        d) for each of the data blocks, selecting the skew detection result of one of the segments from among the skew detection results of all the segments in the data block as a skew detection result of the data block according to a predetermined setting; and
    S2) selecting a skew detection result with the maximum skew from among the skew detection results of all the data blocks of the frame of data over the data channel as a skew detection result of the frame of data over the data channel.

2. The method according to claim 1, wherein step c) is performed block by block for all the data blocks in one frame.

3. The method according to claim 1, wherein step c) is performed independently from each other and in parallel for all the data blocks in one frame.

4. The method according to claim 1, wherein in step c), serial comparison is performed between all the segments in one data block and the corresponding reference data segment by using a serial skew detection circuit with a skew detection capability value C less than the Umax, where the Umax is an integer multiple of the skew detection capability value C.

5. The method according to claim 4, wherein step c) further comprises performing the following on each of the data blocks:
    c1) subdividing both each of the segments in the data block and the corresponding reference data segment into a plurality of sub-segments with a length of the skew detection capability value C; and
    c2) performing search comparison sequentially between each of the sub-segments of the reference data segment and each of the segments in the data block using the serial skew detection circuit.

6. The method according to claim 1, further comprising:
    repeating processing of step S1) to step S2) frame by frame to perform skew detection on the data transmitted over the data channel in a period of plural frames.

7. The method according to claim 1, further comprising:
    performing processing of step S1) to step S2) independently from each other for the plurality of data channels to be subject to skew detection.

8. The method according to claim 7, wherein step S1) further comprises the following step prior to step a):
    delaying data over the plurality of data channels differently from one channel to another, so that the data over the succeeding data channel of any two adjacent ones of the data channels is delayed relative to the data over the preceding data channel by less than the Rmax.

9. The method according to claim 8, wherein, for each of the plurality of data channels, the data over the data channel is delayed so that the current frame of data over the data channel precedes the reference data segment over the reference channel corresponding to the data channel by Rmax/2−Umax/2, thereby making the data over the succeeding data channel be delayed relative to the data over the preceding data channel by the Umax.

10. The method according to claim 3, further comprising:
    performing processing of steps S1) and S2) independently from each other for the plurality of data channels to be subject to skew detection.

11. A device for performing skew detection on data transmitted over one data channel, wherein data of a reference frame over a reference channel is composed sequentially of a reference data segment with a length of maximum common segment (Umax) over each of data channels to be subject to skew detection, and a preset maximum allowable skew detection range is Rmax, where Rmax is an integer multiple of Umax, the device comprising:
- a data block divider, for each frame of data transmitted over one data channel to be subject to skew detection, dividing sequentially the frame of data into a plurality of data blocks starting from the start location of the frame of data according to the maximum allowable skew detection range Rmax;
- a data segment divider dividing each of the data blocks into a plurality of segments each with the length of Umax;
- a comparator performing serial comparison between all the segments in one data block and the reference data segment corresponding to the data channel and output skew detection results of all the segments in the data block;
- a selector selecting the skew detection result of one of the segments from among the skew detection results of all the segments in one data block according to a predetermined setting and output it as a skew detection result of the data block; and
- a frame data skew detection result determiner selecting a skew detection result with the maximum skew from among the skew detection results of all the data blocks in each frame of data over the data channel as a skew detection result of each frame of data over the data channel.

12. The device according to claim 11, wherein the comparator further comprises a control signal generator and a plurality of comparison units,
- the control signal generator generating control signals for the plurality of comparison units in accordance with an enable signal input from the outside, to drive sequentially the plurality of comparison units,
- each of the comparison units respectively comparing each of the segments in one data block with the corresponding reference data segment, to derive the skew detection result of each of the segments, and
- wherein the number of the plurality of comparison units is at least n, which is equal to Rmax/Umax.

13. The device according to claim 12, wherein each of the comparison units performs serial comparison between all the segments in one data block and the corresponding reference data segment using a serial skew detection circuit with a skew detection capability value C less than Umax, where Umax is an integer multiple of the skew detection capability value C.

14. The device according to claim 13, wherein each of the comparison units firstly subdivides both each of the segments in the data block and the corresponding reference data segment into a plurality of sub-segments each with a length of the skew detection capability value C and then performs sequentially search comparison between each of the sub-segments of the reference data segment and each of the segments in the data block using the serial skew detection circuit.

15. The device according to claim 11, wherein the device comprises m comparators and m selectors respectively adapted to perform comparison and selection in parallel on each of the data blocks in one frame, where m is the total number of data blocks into which one frame of data is divided.

16. An apparatus for performing skew detection on data transmitted over a plurality of data channels, comprising:
- a plurality of devices according to claim 11, respectively performing skew detection on data transmitted over each of the plurality of data channels to be subject to skew diction and delayed; and
- a central state machine generating enable signals to be respectively provided to the plurality of devices,
- wherein the enable signal input to each of the devices is controlled to control when to start skew detection on the data over each of the data channels and delay time of the data over each of the data channels.

17. The apparatus according to claim 16, wherein the data over the respective data channels is delayed differently from one channel to another, so that the data over the succeeding data channel of any two adjacent ones of the data channels is delayed relative to the data over the preceding data channel by less than Rmax.

18. The apparatus according to claim 17, wherein the data over each of the data channels is delayed so that the current frame of data over the data channel precedes the reference data segment over the reference channel corresponding to the data channel by Rmax/2−Umax/2, thereby making the data over the succeeding data channel be delayed relative to the data over the preceding data channel by Umax.

19. The apparatus according to claim 16, wherein said apparatus is at least part of a high speed optical communication interface.

20. The apparatus according to claim 19, wherein the high speed optical communication interface is an Serializer/Deserializer (SERDES) framer interface.

* * * * *